United States Patent
Lu et al.

(10) Patent No.: US 7,728,533 B2
(45) Date of Patent: Jun. 1, 2010

(54) BACKLIGHT CONTROL CIRCUIT WITH TWO TRANSISTORS

(75) Inventors: Jian-Hui Lu, Shenzhen (CN); Tong Zhou, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 8 days.

(21) Appl. No.: 11/891,794

(22) Filed: Aug. 13, 2007

(65) Prior Publication Data

US 2008/0036400 A1 Feb. 14, 2008

(30) Foreign Application Priority Data

Aug. 11, 2006 (TW) .............................. 95129585 A

(51) Int. Cl.
H05B 37/00 (2006.01)
(52) U.S. Cl. ................. 315/320; 315/318; 315/291; 349/46
(58) Field of Classification Search .............. 349/58, 349/59, 60, 61, 62, 64, 65, 68, 70, 72, 149, 349/150, 151, 152, 158, 161; 345/7, 8, 50, 345/63, 82, 84, 87, 88, 89, 92, 95, 98, 99, 345/100, 102, 104, 168, 173, 183, 204, 207, 345/211, 212, 213, 501, 690, 905; 315/128, 315/149, 157, 158, 169.3, 169.4, 209 R, 219, 315/220, 224, 226, 246, 247, 276, 277, 278, 315/279, 282, 294, 299, 307, 308, 312, 318, 315/324, 360, DIG. 5, DIG. 7
See application file for complete search history.

(56) References Cited

U.S. PATENT DOCUMENTS

| | | | | |
|---|---|---|---|---|
| 6,442,050 | B2 * | 8/2002 | Chin-Hou et al. | 363/56.11 |
| 6,809,938 | B2 * | 10/2004 | Lin et al. | 363/17 |
| 6,909,238 | B2 | 6/2005 | Huang | |
| 7,330,003 | B2 * | 2/2008 | Zhou et al. | 315/318 |

OTHER PUBLICATIONS

U.S. Appl. No. 11/590,371, filed May 2007, Zhou et al.*
U.S. Appl. No. 11/455,918, filed Dec. 2006, Le et al.*
U.S. Appl. No. 11/974,803, filed Apr. 2008, Zhou et al.*

* cited by examiner

Primary Examiner—Douglas W Owens
Assistant Examiner—Jae K Kim
(74) Attorney, Agent, or Firm—Wei Te Chung

(57) ABSTRACT

An exemplary backlight control circuit (20) includes: at least two load circuits (210), a pulse width modulation integrated circuit (PWM IC) (250) having a current sampling pin (251), a switching circuit (270), and an input circuit (230). Each load circuit includes a backlight and a backlight inspecting circuit having an output end. The switching circuit includes a first transistor which includes a source electrode connected to ground, a drain electrode connected to the current sampling pin, a gate electrode connected to a power supply. The input circuit includes at least two first diodes, at least two input resistor, a second transistor, and a pink-to-pink detector circuit. The pink-to-pink detector circuit includes a second diode, a second bias resistor, and a second filter capacitor. Each output end of the load circuits is connected to the gate electrode of the second transistor via the input resistor, the first and second diode.

16 Claims, 2 Drawing Sheets

US 7,728,533 B2

BACKLIGHT CONTROL CIRCUIT WITH TWO TRANSISTORS

FIELD OF THE INVENTION

The present invention relates to a backlight control circuit typically used in a liquid crystal display (LCD). The instant application relates to the copending application Ser. No. 11/455,918 filed Jun. 19, 2006.

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions.

A typical LCD includes an LCD panel, a plurality of backlights for illuminating the LCD panel, an inverter circuit for driving the backlights, and a backlight control circuit. The backlight control circuit generally includes a pulse width modulation integrated circuit (PWM IC) for driving the inverter circuit, and a backlight protection circuit for shutting down the PWM IC when any one of the backlights has an open circuit or a short circuit connecting to ground.

FIG. 2 is an abbreviated diagram of a typical backlight control circuit 100. The backlight control circuit 100 includes four load circuits 110, a PWM IC 150, and a backlight protection circuit (not labeled). The backlight protection circuit includes a switching circuit 170 and an input circuit 130.

Each load circuit 110 includes a backlight 111 and a backlight inspecting circuit 113 connected in series between a power supply (not shown) and ground. The backlight inspecting circuit 113 includes an output end 112. The output end 112 provides a high voltage when the corresponding backlight 111 works. The output end 112 provides a low voltage when the corresponding backlight 111 has an open circuit or a short circuit connecting to ground.

The PWM IC 150 includes a current sampling pin 151. The PWM IC 150 stops working if the current sampling pin 151 has a low voltage.

The switching circuit 170 includes a first transistor 171 and a current limiting resistor 172. The first transistor 171 includes a source electrode "S", a drain electrode "D", and a gate electrode "G". The source electrode "S" is connected to ground. The drain electrode "D" is connected to the current sampling pin 151 of the PWM IC 150. The gate electrode "G" is connected to a power supply via the current limiting resistor 172. The power supply is provided by a power pin (not labeled) of the PWM IC 150.

The input circuit 130 includes four diodes 131, four resistors 132, four capacitors 135, a second transistor 1332, a third transistor 1333, a fourth transistor 1334, and a fifth transistor 1335. Each transistor 1332, 1333, 1334, 1335 includes a source electrode "S", a drain electrode "D", and a gate electrode "G". The drain electrode "D" of the second transistor 1332 is connected to the gate electrode "G" of the first transistor 171. The drain electrode "D" of the third transistor 1333 is connected to the source electrode "S" of the second transistor 1332. The drain electrode "D" of the fourth transistor 1334 is connected to the source electrode "S" of the third transistor 1333. The drain electrode "D" of the fifth transistor 1335 is connected to the source electrode "S" of the fourth transistor 1334. The source electrode "S" of the fifth transistor 1335 is connected to ground. The gate electrodes "G" of the second, third, fourth, and fifth transistors 1332, 1333, 1334, 1335 are connected to negative terminals of the four diodes 131, respectively. Positive terminals of the four diodes 131 are connected to the output ends 112 of the backlight inspecting circuits 113, respectively. Each of the gate electrodes "G" of the second, third, fourth, and fifth transistors 1332, 1333, 1334, 1335 is connected to ground via a corresponding resistor 132, and is connected to ground via a corresponding capacitor 135.

The first transistor 171, the second transistor 1332, the third transistor 1333, the fourth transistor 1334, and the fifth transistor 1335 are negative-channel metal oxide semiconductor (NMOS) type transistors.

Operation of the backlight control circuit 100 is as follows. When all the backlights 111 work normally, each of the output ends 112 provides a high voltage to the corresponding gate electrode "G" of the second, third, fourth, and fifth transistor 1332, 1333, 1334, 1335 via the corresponding diode 131. Then the second, third, fourth, and fifth transistors 1332, 1333, 1334, 1335 are switched to an activated state, and the gate electrode "G" of the first transistor 171 is connected to ground via the activated second, third, fourth, and fifth transistors 1332, 1333, 1334, 1335. Thus the first transistor 171 is turned off, and the current sampling pin 151 of the PWM IC 150 maintains an original working voltage.

When any one of the backlights 111 has an open circuit or has a short circuit connecting to ground, the corresponding output end 112 provides a low voltage to the corresponding gate electrode "G" of the second, third, fourth, and fifth transistors 1332, 1333, 1334, 1335 via the corresponding diode 131. Then the corresponding second, third, fourth, or fifth transistor 1332, 1333, 1334, 1335 is turned off, so that the gate electrode "G" of the first transistor 171 is charged to a high voltage by the power supply via the current limiting resistor 172. Thus the first transistor 171 is switched to an activated state, and the current sampling pin 151 of the PWM IC 150 is connected to ground via the activated first transistor 171. Consequently, the current sampling pin 151 of the PWM IC 150 is charged to a low voltage, and the PWM IC 150 stops working.

The backlight control circuit 100 includes the five transistors 171, 1332, 1333, 1334, 1335 needed to carry out the function of protecting the backlights 111. Further, the number of transistors needed increases with the number of backlights 111 used in the LCD. Consequently, the cost of the backlight control circuit 100 is high, particularly in the case where the number of backlights 111 is large.

It is desired to provide a backlight control circuit used in an LCD which overcomes the above-described deficiencies.

SUMMARY

In one preferred embodiment, a backlight control circuit includes at least two load circuits, a pulse width modulation integrated circuit (PWM IC), a switching circuit, and an input circuit. Each load circuit includes a backlight and a backlight inspecting circuit connected in series. The backlight inspecting circuit includes an output end. The PWM IC includes a current sampling pin. The switching circuit includes a first transistor which includes a source electrode of the first transistor connected to ground, a drain electrode of the first transistor connected to the current sampling pin of the PWM IC, a gate electrode of the first transistor connected to a direct current (DC) power supply. The input circuit includes at least two first diodes, at least two input resistor, at least two first filter capacitor, a first bias resistor, a second transistor, and a pink-to-pink detector circuit. The pink-to-pink detector circuit includes a second diode, a second bias resistor, and a second filter capacitor. The positive terminals of the first diodes are connected to a positive terminal of the second diode. Each negative terminal of the at least two first diodes is connected to ground via a respective first filter capacitor and is connected to a respective output end of the load circuits via a respective input resistor. A positive terminal of the second diode is connected to the DC power supply via the first bias resistor. A negative terminal of the second diode is connected to a gate electrode of the second transistor and is connected to ground respectively via the second filter capacitor and the second bias resistor. A source electrode of the second transistor is connected to ground. A drain electrode of the second transistor is connected to the gate electrode of the first transistor.

Other novel features and advantages will become more apparent from the following detailed description when taken in conjunction with the accompanying drawings.

DETAILED DESCRIPTION OF PREFERRED EMBODIMENTS

Reference will now be made to the drawings to describe the present invention in detail.

Figure 1:
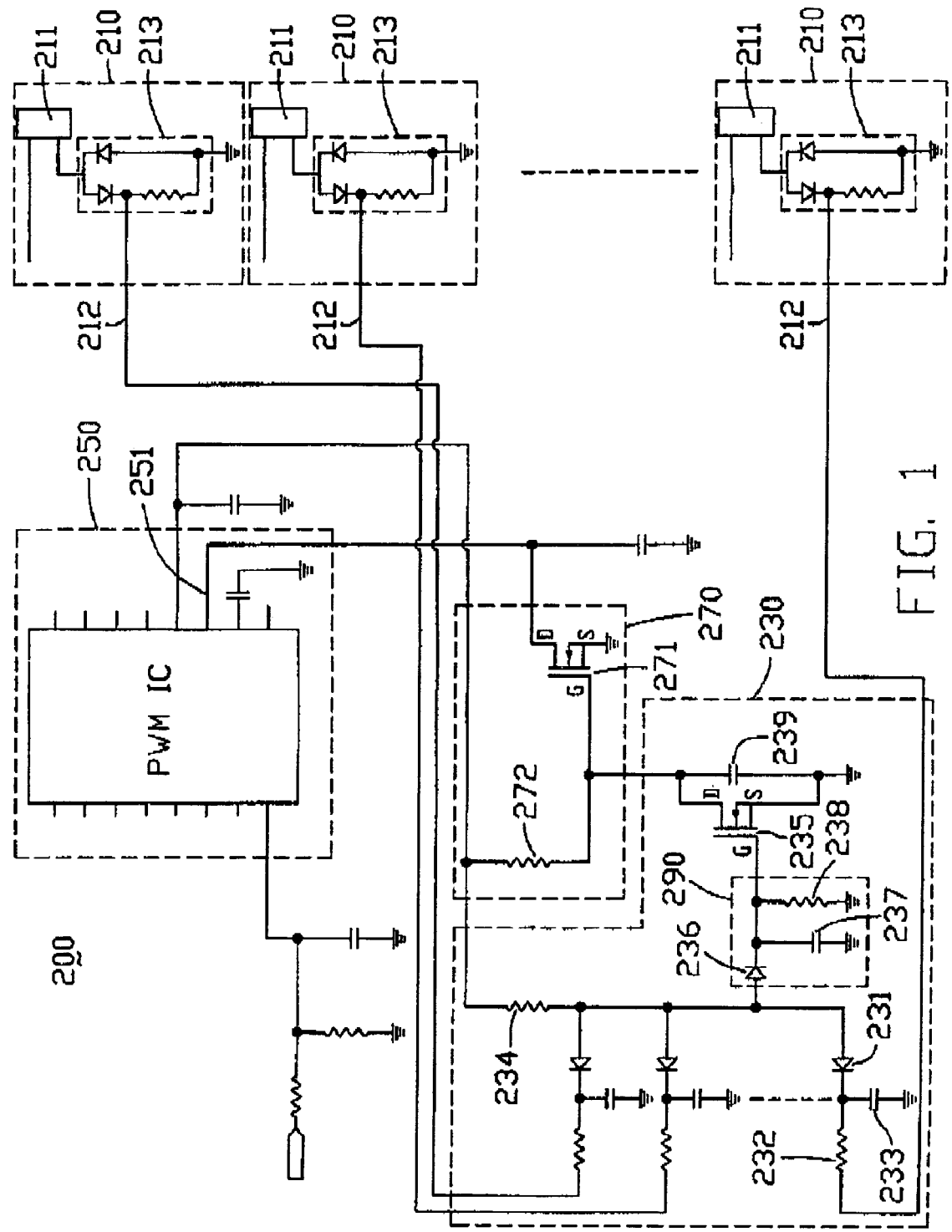
FIG. 1 is an abbreviated diagram of a backlight control circuit according to an exemplary embodiment of the present invention.
Figure 2:
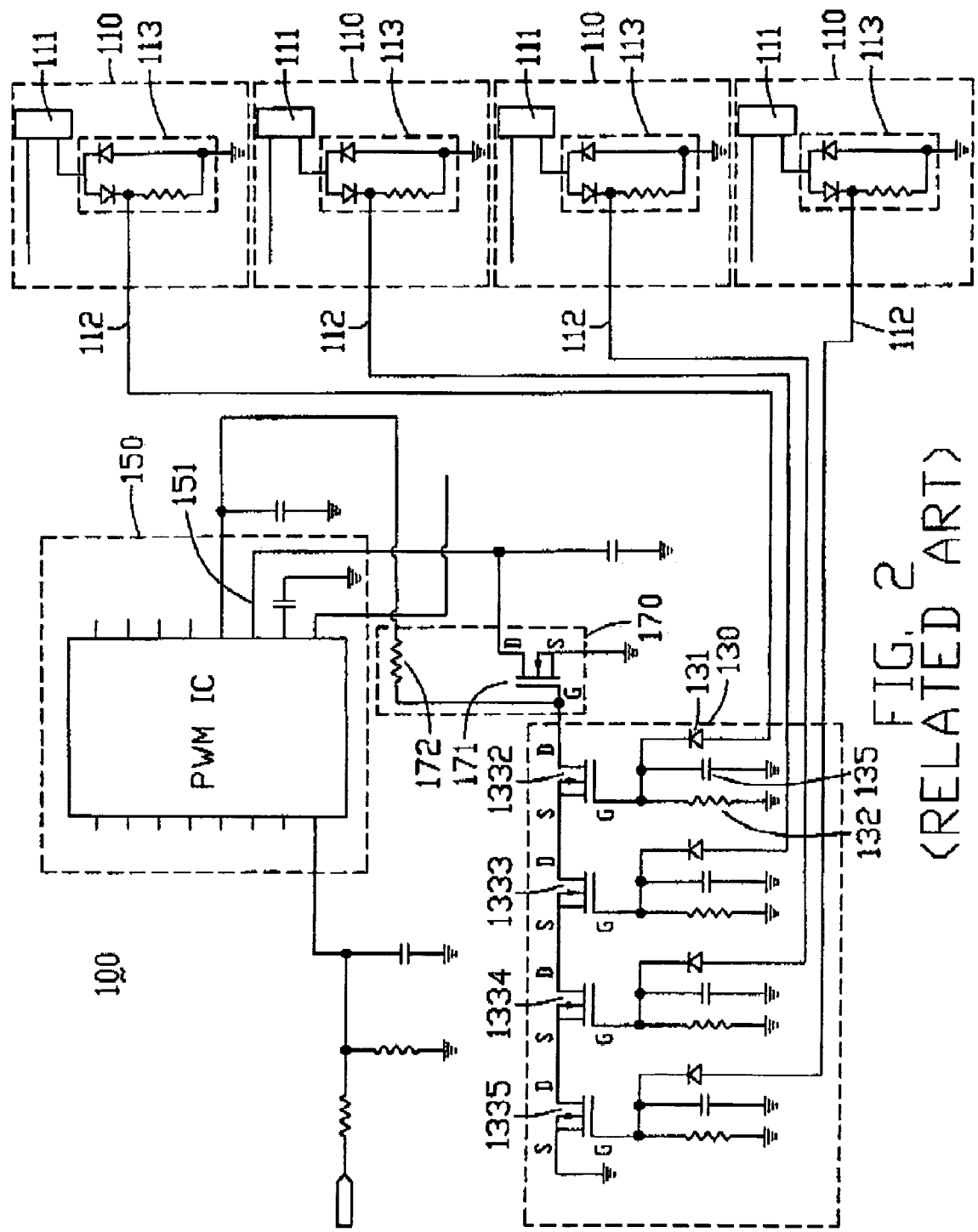
FIG. 2 is an abbreviated diagram of a conventional backlight control circuit.

FIG. 1 is an abbreviated diagram of a backlight control circuit according to an exemplary embodiment of the present invention. The backlight control circuit 200 includes a plurality of load circuits 210, a PWM IC 250, and a backlight protection circuit (not labeled). The backlight protection circuit includes a switching circuit 270 and an input circuit 230. Only three load circuits 210 are illustrated, and unless the context indicates otherwise, in the following description it will be assumed that there are three load circuits 210.

Each load circuit 210 includes a backlight 211 and a backlight inspecting circuit 213 connected in series between a power supply (not shown) and ground. The backlight inspecting circuit 213 includes an output end 212. The output end 212 provides a first load current when the corresponding backlight 211 works. The output end 212 provides a second load current when the corresponding backlight 211 has an open circuit or a short circuit connected to ground.

The PWM IC 250 includes a current sampling pin 251. The PWM IC 250 stops working if the current sampling pin 251 has a low voltage.

The switching circuit 270 includes a first transistor 271 and a current limiting resistor 272. The first transistor 271 includes a source electrode "S", a drain electrode "D", and a gate electrode "G". The source electrode "S" of the first transistor 271 is connected to ground. The drain electrode "D" of the first transistor 271 is connected to the current sampling pin 251 of the PWM IC 250. The gate electrode "G" of the first transistor 271 is connected to a 5V direct current (DC) power supply via the current limiting resistor 272. The 5V DC power supply is provided by a power pin (not labeled) of the PWM IC 250.

The input circuit 230 includes a plurality of first diodes 231, a plurality of input resistors 232, a plurality of first filter capacitors 233, a first bias resistor 234, a second transistor 235, a charging capacitor 239, and a pink-to-pink detector circuit 290. The pink-to-pink detector circuit 290 includes a second diode 236, a second filter capacitor 237, and a second bias resistor 238. Only three first diodes 231, three first filter capacitors 233 and three input resistors 232 are illustrated; and unless the context indicates otherwise, in the following description it will be assumed that there are three first diodes 231, three first filter capacitors 233, and three input resistors 232.

Three positive terminals of the three first diodes 231 are connected to a positive terminal of the second diode 236. A negative terminal of each of the three first diodes 231 is connected to ground via a respective first filter capacitor 233. The negative terminals of the three first diodes 231 are respectively connected to the three output ends 212 of the three load circuits 210 via the three input resistors 232, respectively.

The positive terminal of the second diode 236 is connected to the 5V DC power supply via the first bias resistor 234. A negative terminal of the second diode 236 is connected to a gate electrode "G" of the second transistor 235, and is connected to ground respectively via the second filter capacitor 237 and the second bias resistor 238. A source electrode "S" of the second transistor 235 is connected to ground. A drain electrode "D" of the second transistor 235 is connected to the gate electrode "G" of the first transistor 271. The charging capacitor 239 is connected between the source electrode "S" and the drain electrode "D" of the second transistor 235, for depressing a rush current that would otherwise be generated when the second transistor 235 is turned on.

The first and second diodes 231, 236 can for example be SN4148 type diodes. A resistance of the input resistor 232 is approximately 10 KΩ (kiloohms). A resistance of the current limiting resistor 272 is approximately 180 KΩ. A resistance of the first bias resistor 234 is approximately 100 KΩ. A resistance of the second bias resistor 238 is approximately 470 KΩ. Capacitances of the first and second filter capacitors 233, 237 are both approximately 0.1 μF (microfarads). The PWM IC 250 can for example be an OZ9910G type PWM IC. The first transistor 271 and the second transistor 235 can be negative-channel metal oxide semiconductor (NMOS) type transistors or negative positive negative (NPN) type transistors. The backlight 211 can for example be a cold cathode fluorescent lamp (CCFL).

Generally, operation of the backlight control circuit 200 is as follows. When the backlight 211 of any one of the load circuits 210 works, the output end 212 of the corresponding backlight inspecting circuit 213 generates a first load current with a large value. When the first load current flows through the corresponding input resistor 232 and the corresponding first filter capacitor 233, the first load current is integrated to a 3.0V first DC voltage. The 3.0V first DC voltage is stepped up to 3.7V by the corresponding first diode 231, and transmits to the gate electrode "G" of the second transistor 235 via the pink-to-pink dectector circuit 290. Then the second transistor 235 is switched on, and the gate electrode "G" of the first transistor 271 is connected to ground via the activated second transistor 235. Thus, the first transistor 271 is turned off, and the current sampling pin 251 of the PWM IC 250 maintains an original working voltage.

When any one of the backlights 211 has an open circuit or a short circuit connected to ground, the output end 212 of the corresponding backlight inspecting circuit 210 provides a second load current with a small value. When the second load current flows through the corresponding input resistor 232 and the corresponding first filter capacitor 233, the second load current is integrated to a second DC voltage which is less than 2.0V The second DC voltage is stepped up by the corresponding first diode 231, and transmits to the pink-to-pink dectector circuit 290. The pink-to-pink dectector circuit 290 changes the second DC voltage to a low voltage, and provides the low voltage to the gate electrode "G" of second transistor 235. Then the second transistor 235 is turned off, so that the gate electrode "G" of the first transistor 271 is charged to a high voltage by the 5.0V DC power supply. Thus the first transistor 271 is switched on, so that the current sampling pin 251 of the PWM IC 250 is connected to ground via the activated first transistor 271. Then the current sampling pin 251 of the PWM IC 250 is discharged to a low voltage, and the PWM IC 250 stops working.

The backlight control circuit 200 needs only the two transistors 271, 235 to carry out the function of protecting the backlights 211, no matter how many backlights 211 the backlight control circuit 200 includes. Therefore, the backlight control circuit 200 has a low cost.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A backlight control circuit comprising:
   at least two load circuits, each of the load circuits comprising a backlight and a backlight inspecting circuit connected in series, wherein the backlight inspecting circuit comprises an output end;
   a pulse width modulation integrated circuit (PWM IC) comprising a current sampling pin;
   a switching circuit comprising a first transistor, a source electrode of the first transistor configured to be connected to ground, a drain electrode of the first transistor being connected to the current sampling pin of the PWM IC, a gate electrode of the first transistor configured to be connected to a direct current (DC) power supply; and
   an input circuit comprising at least two first diodes, at least two input resistors, at least two first filter capacitors, a first bias resistor, a second transistor, and a pink-to-pink detector circuit, the pink-to-pink detector circuit comprising a second diode, a second bias resistor, and a second filter capacitor;
   wherein positive terminals of the first diodes are respectively connected to a positive terminal of the second diode, a negative terminal of each of the first diodes is configured to be connected to ground via a respective one of the first filter capacitors and is connected to the output end of a respective one of the load circuits via a respective one of the input resistors, a positive terminal of the second diode is configured to be connected to the DC power supply via the first bias resistor, a negative terminal of the second diode is connected to a gate electrode of the second transistor and is configured to be connected to ground respectively via the second filter capacitor and the second bias resistor, a source electrode of the second transistor is configured to be connected to ground, and a drain electrode of the second transistor is connected to the gate electrode of the first transistor.

2. The backlight control circuit as claimed in claim 1, further comprising a current limiting resistor, wherein the gate electrode of the first transistor is configured to be connected to the DC power supply via the current limiting resistor.

3. The backlight control circuit as claimed in claim 2, wherein a resistance of the current limiting resistor is approximately 180 KΩ.

4. The backlight control circuit as claimed in claim 1, wherein a resistance of each of the input resistors is approximately 10 KΩ.

5. The backlight control circuit as claimed in claim 1, wherein a resistance of the first bias resistor is approximately 100 KΩ.

6. The backlight control circuit as claimed in claim 2, wherein a resistance of the second bias resistor is approximately 470 KΩ.

7. The backlight control circuit as claimed in claim 2, wherein a capacitance of each of the first filter capacitors is approximately 0.1 μF.

8. The backlight control circuit as claimed in claim 2, wherein a capacitance of the second filter capacitor is approximately 0.1 μF.

9. The backlight control circuit as claimed in claim 1, further comprising a charging capacitor connected between the source electrode and the drain electrode of the second transistor.

10. The backlight control circuit as claimed in claim 1, wherein the DC power supply is a 5.0V DC power supply.

11. The backlight control circuit as claimed in claim 1, wherein the DC power supply is provided by a power pin of the PWM IC.

12. The backlight control circuit as claimed in claim 1, wherein the PWM IC is an OZ9910G type PWM IC.

13. The backlight control circuit as claimed in claim 1, wherein the backlight is a cold cathode fluorescent lamp (CCFL).

14. The backlight control circuit as claimed in claim 1, wherein the first and second diodes are SN4148 type diodes.

15. The backlight control circuit as claimed in claim 1, wherein the first and second transistors are negative-channel metal oxide semiconductor (NMOS) type transistors.

16. The backlight control circuit as claimed in claim 1, wherein the first and second transistors arc negative positive negative (NPN) type transistors.

* * * * *